US009096222B2

(12) United States Patent
 Kim

(10) Patent No.: US 9,096,222 B2
(45) Date of Patent: Aug. 4, 2015

(54) SYSTEM AND METHOD FOR LEARNING A TRANSFERRING TORQUE FOR HYBRID VECHICLE

(71) Applicant: Sang Joon Kim, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 56 days.

(21) Appl. No.: 13/972,459

(22) Filed: Aug. 21, 2013

(65) Prior Publication Data
 US 2014/0155222 A1   Jun. 5, 2014

(30) Foreign Application Priority Data
 Dec. 5, 2012   (KR) .................. 10-2012-0140132

(51) Int. Cl.
 *G06F 7/00* (2006.01)
 *B60W 20/00* (2006.01)
 *B60K 6/442* (2007.10)
 *B60W 10/02* (2006.01)

(52) U.S. Cl.
 CPC .............. *B60W 20/108* (2013.01); *B60K 6/442* (2013.01); *B60W 10/02* (2013.01); *B60W 20/106* (2013.01); *B60W 2510/0275* (2013.01); *F16D 2500/50236* (2013.01); *Y02T 10/6234* (2013.01); *Y10S 903/907* (2013.01); *Y10T 477/26* (2015.01)

(58) Field of Classification Search
 CPC . B60W 20/106; B60W 20/108; B60W 20/10; B60W 10/02; B60W 2510/0275; B60K 6/442; F16D 2500/50236; Y10T 477/26; Y10S 903/907; Y02T 10/6234
 See application file for complete search history.

(56) References Cited

U.S. PATENT DOCUMENTS

| 6,233,508 | B1 * | 5/2001 | Deguchi et al. ................. 701/22 |
| 2009/0312895 | A1 * | 12/2009 | Kim et al. ........................ 701/22 |
| 2012/0142488 | A1 * | 6/2012 | Kim et al. ......................... 477/3 |
| 2013/0030625 | A1 * | 1/2013 | Park et al. ....................... 701/22 |
| 2014/0148983 | A1 * | 5/2014 | Kim ................................ 701/22 |

FOREIGN PATENT DOCUMENTS

| JP | 2003-257498 A | 9/2003 |
| JP | 4325132 B2 | 9/2009 |
| KR | 10-2011-0062135 A | 6/2011 |

* cited by examiner

*Primary Examiner* — David D Le
(74) *Attorney, Agent, or Firm* — Mintz Levin Cohn Ferris Glovsky and Popeo, P.C.; Peter F. Corless

(57) ABSTRACT

A system and method for learning a transferring torque for a hybrid vehicle includes: an engine and a motor connected through a clutch; a Hybrid Starter Generator (HSG) that is connected to the engine and is used to start the engine; and a controller for transferring a charging power by the motor to the HSG in a case where the charging power by the motor is greater than or equal to a chargeable power of the battery when the transferring torque is learned through the clutch.

8 Claims, 1 Drawing Sheet

SYSTEM AND METHOD FOR LEARNING A TRANSFERRING TORQUE FOR HYBRID VECHICLE

CROSS-REFERENCE TO RELATED APPLICATION

This application claims under 35 U.S.C. §119(a) the benefit of Korean Patent Application No. 10-2012-0140132 filed on Dec. 5, 2012, the entire contents of which are incorporated herein by reference.

BACKGROUND (a) Technical Field

The present disclosure relates to a system and a method for learning a transferring torque for a hybrid vehicle, capable of improving drivability and mileage by learning a transferring torque of an engine clutch.

(b) Description of the Related Art

Generally, a hybrid vehicle has benefits of improving mileage of a vehicle and satisfying more rigorous On-Board Diagnostics (OBD) regulations with respect to exhaust gas of a vehicle.

One or more of a motor and an engine are provided in the hybrid vehicle, which includes a battery for storing power of a high voltage for driving the motor, an inverter for converting direct voltage from the battery into alternate voltage, and an engine clutch arranged between the engine and the motor to transfer power from the engine to a driving shaft.

The hybrid vehicle is configured to operate in a hybrid electric vehicle (HEV) mode or an electric vehicle (EV) mode by coupling or decoupling an engine clutch in accordance with acceleration/de-acceleration, which is determined by driver operation of an acceleration pedal and a brake pedal, load, a velocity of the vehicle, a state of charging a battery (SOC), etc.

When a hybrid vehicle converts into a HEV mode from an EV mode, the engine clutch is coupled after the velocities of the engine and the motor are synchronized, so as not to produce torque variation in a course of transferring power between the engine and the motor of different power sources, thereby ensuring drivability of a vehicle.

However, in a case of keeping a battery at a low state of charging (LOW SOC), under the conditions that the temperatures of the battery and the motor exceed set standard temperature conditions, and a gradient of a road on which a vehicle is driving has a steep slope surface, etc., there arises a case where the vehicle has to start by slip-controlling the engine clutch. In particular, precise pressure control is required in order to slip-control the engine clutch under the driving conditions as described above.

A transferring torque of the engine clutch refers to a torque transferred with friction surfaces to which both ends of the engine clutch are in contact physically (i.e., a load applied to both ends of the engine clutch), which can be estimated basically through an effective pressure and a frictional coefficient.

In a starting operation of a hybrid vehicle, a control of an engine clutch is an important parameter that influences drivability and mileage; however, there occur characteristic deviations that influence the control of the engine clutch, such as: the variations of the current and pressure of a solenoid valve for operating the engine clutch, deterioration of the solenoid valve, and variation of the frictional coefficient due to deterioration of frictional materials disposed on both ends of the engine clutch.

As described above, there occur characteristic deviations in the hybrid vehicle in accordance with durability of the components related to the control of the engine clutch, and thereby not controlling precisely the engine clutch can worsen the drivability and mileage.

A conventional hybrid vehicle does not incorporate technology for learning a transferring torque of the engine clutch, and thus there may occur characteristic deviations per kind of vehicle with respect to estimating the transferring torque. Accordingly, differences of the starting acceleration velocity may occur in a control of the engine clutch for the starting acceleration per kind of vehicle and in accordance with durability.

Further, the elements that are feed-forwarded to the engine controller in a control of the engine clutch for the starting acceleration are not accurate, and thus control of an engine velocity may not respond optimally to the starting acceleration. Accordingly, a technology for estimating more precisely a transferring torque through a clutch has been required.

The description provided above as a related art of the present invention is just for helping understanding the background of the present invention and should not be construed as being included in the related art known by those skilled in the art.

SUMMARY

The present invention provides a system and a method for learning a transferring torque for a hybrid vehicle, capable of improving drivability, a response to a starting acceleration, and a mileage, regardless of durability of components, by learning a transferring torque of different characteristic deviations of the components related to a control of an engine clutch.

An object of the present invention relates to providing a system and a method for learning a transferring torque for a hybrid vehicle, capable of learning a transferring torque in a case where a battery is charged fully, or the battery cannot be charged in an extreme situation.

A system for learning a transferring torque for a hybrid vehicle of the present invention may include: an engine and a motor connected through a clutch; a Hybrid Starter and Generator (HSG) that is connected to the engine and is used to start the engine; and a controller for transferring a charging power by the motor to the HSG in a case where the charging power by the motor is greater than or equal to a chargeable power of the battery when the transferring torque is learned through the clutch.

The controller may control the battery to be charged through the charging power by the motor in a case where the charging power by the motor is greater than the chargeable power of the battery.

The controller may control the engine and the motor to keep the rpms thereof substantially constant, where the rpm of the engine is greater than that of the motor.

The controller may control a remaining amount of the charging power by the motor by deducting the chargeable power of the battery to be transferred to the HSG in a case where the charging power by the motor is greater than or equal to the chargeable power of the battery.

The controller may control a remaining amount of the charging power by the motor by deducting the power consumed by the electronic device to be transferred to the HSG in a case where the charging power by the motor is greater than or equal to the chargeable power of the battery.

The controller may control a remaining amount of the charging power by the motor by deducting the chargeable power of the battery and the power consumed by the electronic device to be transferred to the HSG in a case where the charging power by the motor is greater than or equal to the chargeable power of the battery. The controller may measure a free-load torque for driving the motor at a constant rpm in a state of the clutch being not connected and measure a load torque for driving the motor at a constant rpm in a state of the clutch being connected, where a transferring torque is estimated through the difference of the free-load torque and the load torques, and the transferring torque that is prepared in advance is corrected through the transferring torque.

Further, in order to achieve the above objects, a method for learning a transferring torque for a hybrid vehicle of the present invention may include steps of:
beginning to learn the transferring torque through a clutch; comparing a charging power by a motor to a chargeable power of a battery; consuming the charging power by transferring the charging power by the motor to a HSG in a case where the charging power by the motor is greater than or equal to the chargeable power of the battery; and charging the power by transferring the charging power by the motor to the battery in a case where the charging power by the motor is less than the chargeable power of the battery.

A method for learning a transferring torque for a hybrid vehicle provided with an engine, a motor, a clutch and a HSG connected to the engine is provided such that when the transferring torque is learned through the clutch, the charging power by the motor is transferred to the HSG in a case where the charging power by the motor is greater than or equal to the chargeable power of the battery.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
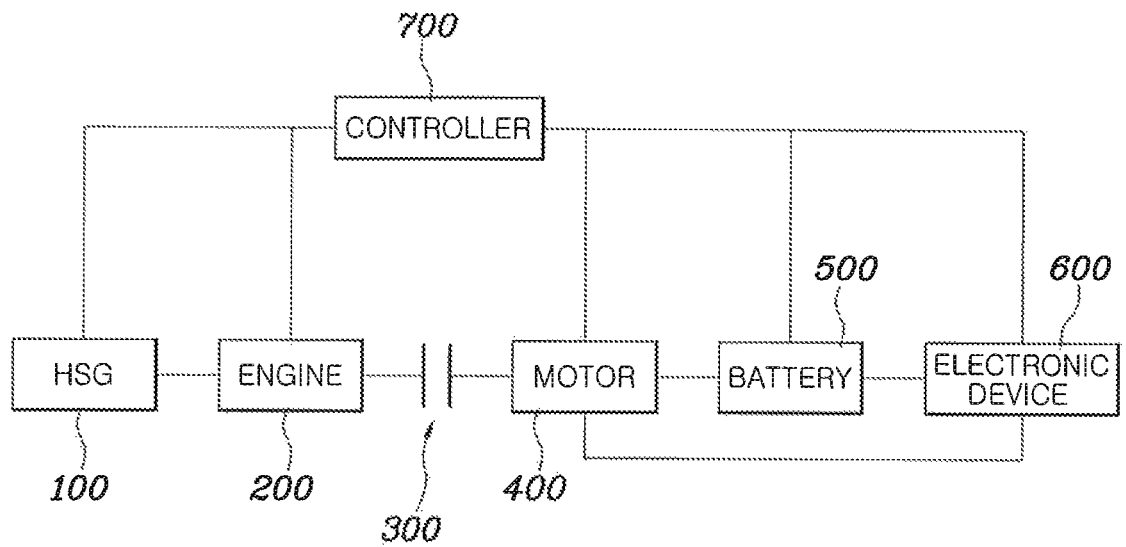
FIG. 1 is a block diagram showing a system for learning a transferring torque for a hybrid vehicle according to an embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION OF THE INVENTION

Hereinafter, a system and a method for learning a transferring torque for a hybrid vehicle will be described, referring to the accompanying drawings. As used herein, the term "transferring torque" of an engine clutch refers to a torque transferred to friction surfaces in which both ends of the engine clutch are in contact physically (i.e., a load applied to both ends of the engine clutch), which can be estimated basically through an effective pressure and a frictional coefficient.

Figure 2:
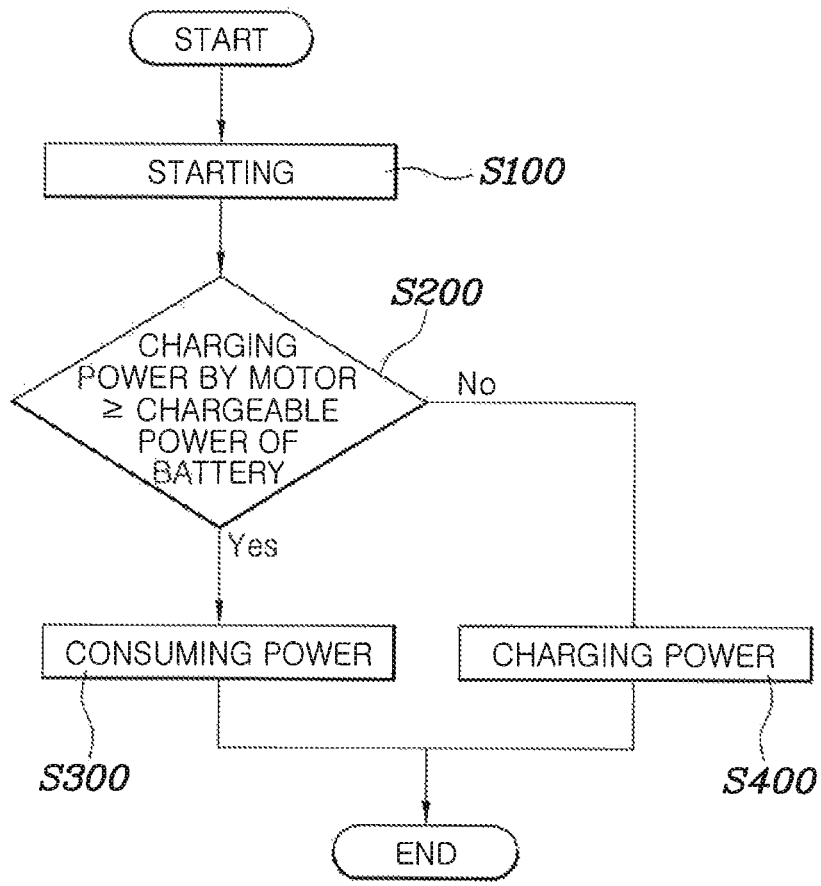
FIG. 2 is a flow chart showing a method for learning the transferring torque for a hybrid vehicle according to the embodiment depicted in FIG. 1.

FIG. 1 is a block diagram showing a system for learning a transferring torque for a hybrid vehicle according to an embodiment of the present invention, and FIG. 2 is a flow chart showing a method for learning the transferring torque for a hybrid vehicle according to the embodiment of the present invention.

A system for learning a transferring torque for a hybrid vehicle includes: an engine 200 and a motor 400 connected through a clutch 300; a HSG (Hybrid Starter and Generator) 100 that is connected to the engine 200 and serves an operation of starting/generating the engine 200; and a controller 700 for transferring a charging power by the motor 400 to the HSG 100 in a case where the charging power by the motor 400 is greater than or equal to a chargeable power of the battery 500 when the transferring torque is learned through the clutch 300.

In general, the HSG 100 is connected to an engine and is used to start the engine to control a velocity of the engine. Further, the engine is connected to a motor through a clutch, the motor is connected to a battery to charging and discharging it, and the battery is connected to an electronic device to supply current thereto.

Under this configuration, it is very difficult to estimate directly a transferring torque that is transferred through the clutch, and thus a map of the transferring torque may be prepared and the clutch may be controlled, referring to the map. Further, the map prepared for the clutch may be modified in a vehicle, referring to the transferring torque that is estimated and learned periodically, to consider the variations due to deterioration of the clutch.

A transferring torque is learned for this purpose in which a necessary motor torque is measured in a case where a velocity of the motor is controlled in a free-load state, an engine and the motor are connected through the clutch to control the velocity. In this case, the transferring torque can be estimated with the difference of the measured motor torques after and before a clutch operation. The learning of the transferring torque refers to when the map is amended (or corrected) more precisely by comparing the estimated values to the values stored in the map.

Meanwhile, in this case, the controller 700 controls the engine 200 and the motor 400 to keep the rpms thereof substantially constant, where the rpm of the engine 200 is greater than that of the motor 400, and thus the transferring torque that is slipped from the engine and provided to the motor can be estimated. Further, when the motor generates electricity in accordance with the transferred torque, the generated electric energy is to be charged to a battery.

Meanwhile, the controller 700 does not control a velocity of the motor in accordance with not charging the battery in a case where a charging power by the motor 400 is greater than or equal to a chargeable power of the battery 500, and the clutch may fail eventually, when the transferring torque is learned through the clutch 300. Accordingly, in this case, the charging power by the motor 400 is allowed to be transferred to the HSG 100 so that the generated electric energy is to be consumed by the HSG.

As a result, the HSG transfers a driving force back to the engine and thus the engine deducts a driving torque by the same amount as the driving force transferred thereto. However, since the engine is still under control for its velocity, the transferring torque that is transferred to the motor is kept as the same amount. That is, the energy that is charged from the motor by the transferring torque is transferred to, not the battery, but the HSG, and as a result mileage of the engine can be improved.

Accordingly, the charging energy that is generated during a learning of the transferring torque is to be stored in the battery in a case where the battery can accommodate the energy, and the energy otherwise can be saved by reducing an engine load.

Meanwhile, the chargeable power of the battery 500 may be determined through a general stage of charge (SOC) for a battery; however, it may be affected by a case where the charging is not performed normally at an extremely low temperature or when the battery has failed. Accordingly, when the SOC is 90% or more, or the chargeable power is an infinitesimal quantity at an extreme low temperature, the charging current is discharged, not to the battery, but to HSG in order to prevent burning loss of the motor and the clutch.

Further, as described above, the controller 700 controls the battery 500 to be charged through the charging power by the motor 400 in a case where the charging power by the motor 400 is than the chargeable power of the battery 500.

Further, the controller 700 controls a remaining amount of the charging power by the motor 400 with deducting the chargeable power of the battery 500 to be transferred to the HSG 100 in a case where the charging power by the motor 400 is greater than or equal to the chargeable power of the battery 500, and thus current is to be discharged to the HSG in a case where charging is impossible anymore after charging through the battery.

Further, the controller 700 controls a remaining amount of the charging power by the motor 400 by deducting the power consumed by the electronic device 600 to be transferred to the HSG 100 in a case where the charging power by the motor 400 is greater than or equal to the chargeable power of the battery 500, and thus the charging power by the motor may be discharged basically to the current consumed by the electronic device and the remaining power may be discharged to the HSG.

Further, the controller 700 may control a remaining amount of the charging power by the motor 400 by deducting the chargeable power of the battery 500 and the power consumed by the electronic device to be transferred to the HSG 100 in a case where the charging power by the motor 400 is greater than or equal to the chargeable power of the battery 500.

Meanwhile, the controller 700 measures a freeload torque for driving the motor 400 at a constant rpm in a state of the clutch 300 being not connected and measures a load torque for driving the motor 400 at a constant rpm in a state of the clutch 300 being connected, where a transferring torque is estimated through the difference of the freeload torque and the load torques, and the transferring torque that is prepared in advance is corrected through the transferring torque, thereby to learn the transferring torque, as described above.

Meanwhile, a method for learning a transferring torque includes: beginning to learn a transferring torque through a clutch (S100); comparing a charging power by a motor to a chargeable power of a battery (S200); consuming the charging power by transferring the charging power by the motor to a HSG in a case where the charging power by the motor 400 is greater than or equal to the chargeable power of the battery 500 (S300); and charging the charging power by transferring the charging power by the motor to the battery in a case where the charging power by the motor 400 is less than the chargeable power of the battery 500 (S400).

That is, first, a motor torque is estimated by controlling a velocity of a motor and a velocity of an engine, and then a clutch is connected to the motor and the engine. After that, the comparing step S200 is performed by comparing a charging power by the motor to a chargeable power of a battery, and the consuming step S300 is performed by transferring the charging power by the motor to the HSG in a case where the charging power by the motor 400 is greater than or equal to the chargeable power of the battery 500. Here, when the charging power by the motor is less than the chargeable power of the battery, the charging step S400 is performed by transferring the charging power by the motor to the battery. After that, a correct transferring torque is to be estimated by measuring the motor torque.

Further, the method for learning the transferring torque refers to a method for learning a transferring torque for a hybrid vehicle provided with an engine, a motor, a clutch and a HSG connected to the engine, where it is understood that when the transferring torque is learned through the clutch, the charging power by the motor is transferred to the HSG in a case where charging power by the motor is greater than or equal to the chargeable power of the battery.

That is, according to the method for learning a transferring torque of the present invention, a motor torque after and before clutching is measured basically in control states of the velocities of the engine and the motor, and the transferring torque is estimated through the difference of the measured motor torques, and then the existing transferring torque provided in a map is amended using the actually measured transferring torque.

For this purpose, the motor generates electricity through the transferring torque that is transferred to the motor from the engine and the generated energy is charged to the battery, where the energy is consumed to the engine by driving the HSG in a case where it is impossible to charge the battery, and thus the energy generated during a learning of the transferring torque is recovered eventually.

Further, according to the method for learning a transferring torque, it is possible to draw an accurate map of the transferring torque by learning effectively the transferring torque even in a situation where it is impossible to charge the battery.

According to the system and the method for learning a transferring torque for a hybrid vehicle as configured above, drivability, a response to a starting acceleration and a mileage can be improved, regardless of proceedings of durability, by learning a transferring torque of different characteristic deviations of the components related to a control of an engine clutch.

Specifically, according to the system and the method for learning a transferring torque for a hybrid vehicle of the present invention, the battery can be charged by learning the transferring torque, and further energy is transferred to the HSG in a case where a battery is charged fully, or the battery cannot be charged in an extreme situation, thereby being capable of learning the transferring torque and improving a mileage.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A system for learning a transferring torque for a hybrid vehicle, comprising:
    an engine and a motor connected through a clutch;
    a Hybrid Starter and Generator (HSG) that is connected to the engine and is used to start the engine; and
    a controller for transferring a charging power by the motor to the HSG in a case where the charging power by the motor is greater than or equal to a chargeable power of a battery when the transferring torque is learned through the clutch,
    wherein, in the case where the charging power by the motor is greater than or equal to the chargeable power of the battery, the controller controls a remaining amount of the charging power by the motor by deducting: i) the chargeable power of the battery to be transferred to the HSG, ii) the power consumed by an electronic device to be transferred to the HSG, or iii) the chargeable power of the battery and the power consumed by the electronic device to be transferred to the HSG.

2. The system for learning a transferring torque for a hybrid vehicle of claim 1, wherein the controller controls the battery to be charged through the charging power by the motor in a case where the charging power by the motor is less than the chargeable power of the battery.

3. The system for learning a transferring torque for a hybrid vehicle of claim 1, wherein the controller controls the engine and the motor to keep an rpm of the motor substantially constant, wherein an rpm of the engine is greater than that of the motor.

4. A method for learning a transferring torque for a hybrid vehicle, comprising:
    beginning to learn the transferring torque through a clutch;
    comparing, by a controller, a charging power by a motor to a chargeable power of a battery;
    consuming the charging power by transferring, by the controller, the charging power by the motor to a Hybrid Starter and Generator (HSG) in a case where the charging power by the motor is greater than or equal to the chargeable power of the battery;
    charging the charging power by transferring, by the controller, the charging power by the motor to the battery in a case where the charging power by the motor is less than the chargeable power of the battery; and
    controlling, by the controller, a remaining amount of the charging power by the motor, in the case where the charging power by the motor is greater than or equal to the chargeable power of the battery, by deducting: i) the chargeable power of the battery to be transferred to the HSG, ii) the power consumed by an electronic device to be transferred to the HSG, or iii) the chargeable power of the battery and the power consumed by the electronic device to be transferred to the HSG.

5. A hybrid vehicle, comprising:
    an engine and a motor connected through a clutch;
    a Hybrid Starter and Generator (HSG) that is connected to the engine and is used to start the engine; and
    a controller for transferring a charging power by the motor to the HSG in a case where the charging power by the motor is greater than or equal to a chargeable power of a battery when the transferring torque is learned through the clutch,
    wherein, in the case where the charging power by the motor is greater than or equal to the chargeable power of the battery, the controller controls a remaining amount of the charging power by the motor by deducting: i) the chargeable power of the battery to be transferred to the HSG, ii) the power consumed by an electronic device to be transferred to the HSG, or iii) the chargeable power of the battery and the power consumed by the electronic device to be transferred to the HSG.

6. The hybrid vehicle of claim 5, wherein the controller controls the battery to be charged through the charging power by the motor in a case where the charging power by the motor is less than the chargeable power of the battery.

7. The hybrid vehicle of claim 5, wherein the controller controls the engine and the motor to keep an rpm of the motor substantially constant, wherein the pan rpm of the engine is greater than that of the motor.

8. A system for learning a transferring torque for a hybrid vehicle, comprising:
    an engine and a motor connected through a clutch;
    a Hybrid Starter and Generator (HSG) that is connected to the engine and is used to start the engine; and
    a controller for transferring a charging power by the motor to the HSG in a case where the charging power by the motor is greater than or equal to a chargeable power of a battery when the transferring torque is learned through the clutch, wherein
    the controller measures a free-load torque for driving the motor at a constant rpm in a state of the clutch being not connected and measures a load torque for driving the motor at the constant rpm in a state of the clutch being connected,
    the transferring torque is estimated through a difference of the free-load torque and the load torques, and
    the transferring torque that is prepared in advance is corrected through the transferring torque.

* * * * *